(12) United States Patent
Su et al.

(10) Patent No.: US 8,873,877 B2
(45) Date of Patent: Oct. 28, 2014

(54) ADAPTIVE FALSE CONTOURING PREVENTION IN LAYERED CODING OF IMAGES WITH EXTENDED DYNAMIC RANGE

(71) Applicant: Dolby Laboratories Licensing Corporation, San Francisco, CA (US)

(72) Inventors: Guan-Ming Su, Fremont, CA (US); Sheng Qu, San Jose, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/353,090

(22) PCT Filed: Nov. 1, 2012

(86) PCT No.: PCT/US2012/062958
§ 371 (c)(1),
(2), (4) Date: Apr. 21, 2014

(87) PCT Pub. No.: WO2013/067113
PCT Pub. Date: May 10, 2013

(65) Prior Publication Data
US 2014/0294313 A1 Oct. 2, 2014

Related U.S. Application Data

(60) Provisional application No. 61/554,294, filed on Nov. 1, 2011.

(51) Int. Cl.
*G06K 9/36* (2006.01)
*G06T 9/00* (2006.01)

(52) U.S. Cl.
CPC .................................... *G06T 9/00* (2013.01)
USPC ......................................... 382/239; 382/275

(58) Field of Classification Search
USPC ......... 382/232–251, 275; 375/240.01–240.29
See application file for complete search history.

(56) References Cited

U.S. PATENT DOCUMENTS

| 4,959,730 A | 9/1990 | Tai |
| 5,638,126 A | 6/1997 | Lim |

(Continued)

FOREIGN PATENT DOCUMENTS

| EP | 1162571 | 12/2001 |
| JP | 6-62280 | 3/1994 |

(Continued)

OTHER PUBLICATIONS

Jin, X et al. "Composite Model-Based DC Dithering for Suppressing Contour Artifacts in Decompressed Video" IEEE Transactions on Image Processing, vol. 20, No. 8, Aug. 2011, pp. 2110-2121.

(Continued)

*Primary Examiner* — Ishrat I Sherali (57) ABSTRACT

An encoder receives a sequence of images in extended or visual dynamic range (VDR). For each image, a dynamic range compression function and associated parameters are selected to convert the input image into a second image with a lower dynamic range. Using the input image and the second image, a residual image is computed. The input VDR image sequence is coded using a layered codec that uses the second image as a base layer and a residual image that is derived from the input and second images as one or more residual layers. Using the residual image, a false contour detection method (FCD) estimates the number of potential perceptually visible false contours in the decoded VDR image and iteratively adjusts the dynamic range compression parameters to prevent or reduce the number of false contours. Examples that use a uniform dynamic range compression function are also described.

24 Claims, 7 Drawing Sheets (56) References Cited

U.S. PATENT DOCUMENTS

| | | | |
|---|---|---|---|
| 5,991,457 A * | 11/1999 | Ito et al. | 382/254 |
| 6,072,913 A * | 6/2000 | Yamada | 382/275 |
| 6,792,157 B1 | 9/2004 | Koshi | |
| 6,943,831 B2 * | 9/2005 | Gallagher et al. | 348/222.1 |
| 7,079,700 B2 * | 7/2006 | Shinbata | 382/254 |
| 7,177,481 B2 * | 2/2007 | Kaji | 382/265 |
| 7,180,480 B2 | 2/2007 | Lee | |
| 7,209,182 B2 | 4/2007 | Kawabata | |
| 7,551,795 B2 | 6/2009 | Xu | |
| 7,580,158 B2 * | 8/2009 | Sugimoto | 358/3.27 |
| 7,660,484 B2 | 2/2010 | Ahn | |
| 7,747,100 B2 | 6/2010 | Kim | |
| 7,760,949 B2 * | 7/2010 | Segall | 382/232 |
| 7,925,086 B2 | 4/2011 | Zhou | |
| 7,990,343 B2 | 8/2011 | Takahashi | |
| 8,120,679 B2 * | 2/2012 | Ishiga | 348/252 |
| 8,508,617 B2 * | 8/2013 | Jia et al. | 348/223.1 |
| 8,537,893 B2 * | 9/2013 | Efremov et al. | 375/240.12 |
| 2002/0034336 A1 * | 3/2002 | Shiota et al. | 382/274 |
| 2005/0207492 A1 | 9/2005 | Pao | |
| 2006/0280242 A1 | 12/2006 | Ugur | |
| 2007/0189391 A1 * | 8/2007 | Shinbata | 375/240.19 |
| 2007/0286515 A1 | 12/2007 | Kim | |
| 2008/0193032 A1 * | 8/2008 | Segall | 382/251 |
| 2009/0060375 A1 | 3/2009 | Lim | |
| 2011/0129020 A1 | 6/2011 | Li | |
| 2011/0194618 A1 * | 8/2011 | Gish et al. | 375/240.25 |
| 2013/0148907 A1 * | 6/2013 | Su et al. | 382/238 |
| 2014/0029675 A1 | 1/2014 | Su | |
| 2014/0050271 A1 * | 2/2014 | Su et al. | 375/240.26 |

FOREIGN PATENT DOCUMENTS

| | | |
|---|---|---|
| WO | 2008/088482 | 7/2008 |
| WO | 2012/147022 | 11/2012 |

OTHER PUBLICATIONS

Lee, Y. H. et al "An Adaptive Image Bit-Depth Scaling Method for Displays" Consumer Electronics, Transactions on IEEE, vol. 56, Issue 1, 2010, pp. 399-400.

Xu, N et al. "A Simple and Effective Algorithm for False Contour Reduction in Digital Television" Conference on Digest of Digest of Technical Papers International, 2010, pp. 231-232.

Monet P. et al "Block Adaptive Quantization of Images" IEEE Transactions on Communications, IEEE Service Center, Piscataway, NJ, USA, vol. 41, No. 2, Feb. 1, 1993, pp. 303-306.

Lai, P. et al "Depth Map Processing with Iterative Joint Multilateral Filtering" Picture Coding Symposium, Dec. 8, 2010, 28th Picture Coding Symposium, Nagoya, Japan.

Shao, L. et al "Quality Adaptive Least Squares Trained Filters for Video Compression Artifacts Removal Using a No-Reference Block Visibility Metric" Journal of Visual Communication and Image Representation, Academic Press, vol. 22, No. 1, Jan. 1, 2011, pp. 23-32.

Damkat, Chris "Post-Processing Techniques for Compression Artifact Removal in Block-Coded Video and Images" Jan. 1, 2004, Master's Thesis, Faculty of Engineering of the Eindhoven University of Technology, pp. 1-35.

Yuen M. et al "Reconstruction Artifacts in Digital Video Compression" Proceedings of SPIE, International Society for Optical Engineering, vol. 2419 Feb. 7, 1995, pp. 455-465.

Bjontegaard, G. et al "Definition of New Coding Elements from Telenor" VCEG Meeting, May 16-19, 2000, ITU-Telecommunications Standardization Sector, Study Group 16.

Segall C. A. et al "Enhancement of Compressed Video Using Visual Quality Measurements" Image Processing, 2000 International Conference on Sep. 10-13, 2000, vol. 2, pp. 645-648.

Yuen M. et al "A Survey of Hybrid MC/DPCM/DCT Video Coding Distortions" Signal Processing, Elsevier Science Publishers B.V. Amsterdam, NL, vol. 70, No. 3, Nov. 30, 1998, pp. 247-278.

List P. et al "Adaptive Deblocking Filter" IEEE Transactions on Circuits and Systems for Video Technology, IEEE Service Center, Piscataway, NJ, USA, vol. 13, No. 7, Jul. 1, 2003, pp. 614-619.

\* cited by examiner

ADAPTIVE FALSE CONTOURING PREVENTION IN LAYERED CODING OF IMAGES WITH EXTENDED DYNAMIC RANGE

CROSS-REFERENCE TO RELATED APPLICATIONS

This application claims priority to U.S. Provisional Patent Application No. 61/554,294 filed 1 Nov. 2011, hereby incorporated by reference in its entirety.

FIELD OF THE INVENTION

The present invention relates generally to images. More particularly, an embodiment of the present invention relates to the adaptive prevention of false contouring artifacts in layered coding of images with extended dynamic range.

BACKGROUND OF THE INVENTION

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'extended dynamic range', 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term VDR images or pictures may relate to images or pictures wherein each pixel component is represented by more than 8 bits.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

As with the scalable video coding and HDTV technologies, extending image DR typically involves a bifurcate approach. For example, scene referred HDR content that is captured with a modern HDR capable camera may be used to generate either a VDR version or an SDR version of the content, which may be displayed on either a VDR display or a conventional SDR display. To conserve bandwidth or for other considerations, one may transmit VDR signals using a layered or hierarchical approach, using an SDR base layer (BL) and an enhancement layer (EL). Legacy decoders that receive the layered bit stream may use only the base layer to reconstruct an SDR picture; however, VDR-compatible decoders can use both the base layer and the enhancement layer to reconstruct a VDR stream.

In such layered VDR coding, images may be represented at different spatial resolutions, bit depths, and color spaces. For example, typical VDR signals are represented using 12 or more bits per color component, while typical SDR signals are represented using 8 bits per color component. Furthermore, base layer and enhancement layer signals may be further compressed using a variety of image and video compression schemes, such as those defined by the ISO/IEC Recommendations of the Motion Pictures Expert Group (MPEG), such as MPEG-1, MPEG-2, MPEG-4, part 2, and H.264.

Layered VDR coding introduces quantization in at least two segments of the coding pipeline: a) during the transformation of the VDR signal from a first bit depth (e.g., 12-bits per color component) to an SDR signal of a second, lower, bit depth (e.g., 8 bits per color component), and b) during the compression process of the base and enhancement layers. False contours may appear on reconstructed images as an artifact of such quantization The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Adaptive prevention of false contouring artifacts in VDR layered coding is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the adaptive quantization of VDR video signals to prevent false contouring artifacts in layered coding. In an embodiment, an encoder receives a sequence of images in extended or visual dynamic range (VDR). For each image, a dynamic range compression function and associated parameters are selected to convert the input image into a second image with a lower dynamic range. Using the input image and the second image, a residual image is computed. The input VDR image sequence is coded using a layered codec that uses the second image as a base layer and a residual image that is derived from the input and second images as one or more residual layers. Using the residual image, a false contour detection method (FCD) estimates the number of potential perceptually visible false contours in the decoded VDR image and iteratively adjusts the dynamic range compression parameters to reduce the number of false contours.

In an example embodiment the dynamic range compression function comprises a uniform quantizer.

In an example embodiment, the FCD method comprises a pixel-level contour detector and a picture-level contour detector.

In another embodiment, an encoder receives a scene (e.g., a group of pictures) of VDR images. A uniform dynamic range compression function comprising frame-dependent parameters $C_L[i]$ and $C_H[i]$ is applied to each frame i to convert each VDR image into an SDR image, where the SDR image has a lower dynamic range than the VDR image. After setting initial $C_L[i]$ and $C_H[i]$ values, in an iterative process, a residual image is computed using each VDR image and its corresponding SDR image. Using the residual image, a false contour detection method (FCD) computes the number of perceptually visible false contours in the residual image and iteratively adjusts either $C_L[i]$ or $C_H[i]$ to reduce the occurrence of false contours. After processing all frames in the scene, a scene-dependent $C_H$ value is computed based on the maximum of all the $C_H[i]$ values, and a scene-dependent $C_L$ value is computed based on the minimum of all the $C_L[i]$ values. During the compression of the input scene, the uniform dynamic range compression function is applied to all the images in the scene using the computed scene-dependent $C_H$ and $C_L$ values.

In another embodiment, a false contour detection metric is computed by comparing the edge contrast of a false contour to a visibility threshold based on system parameters and a model of a contrast sensitivity function (CSF).

Example Layered VDR System

Figure 1:
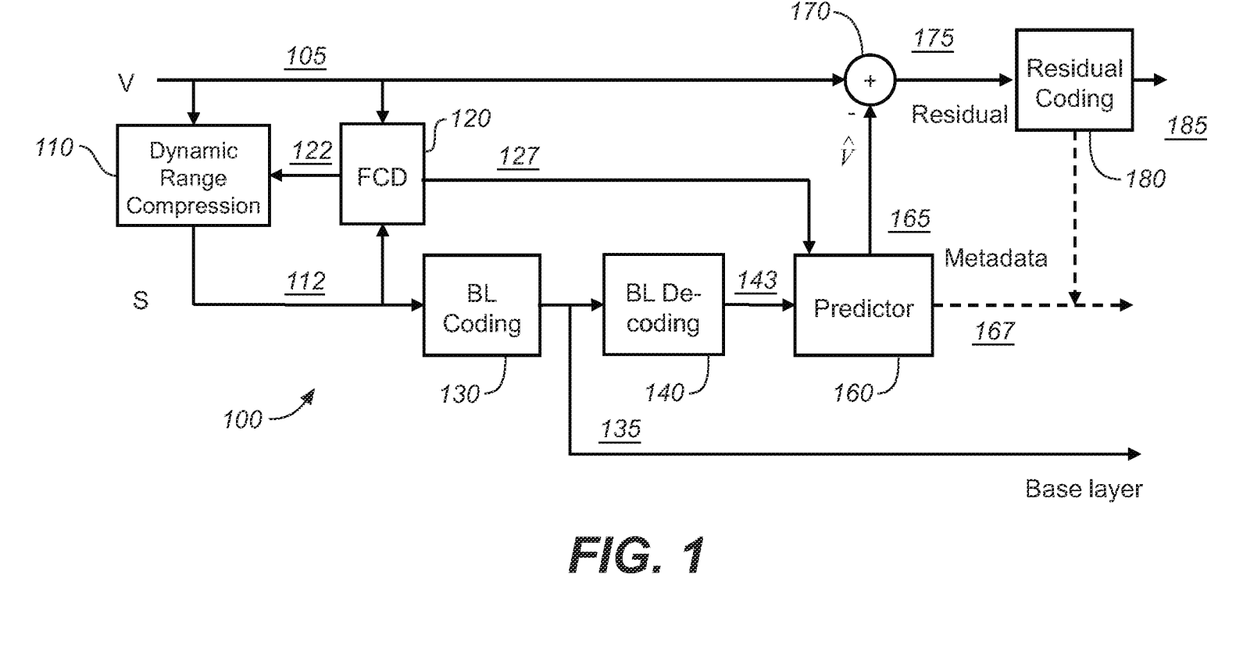
FIG. 1 depicts an example data flow for a layered-coding system according to an embodiment of the present invention.

FIG. 1 depicts an example image processing system 100 implementing layered or hierarchical VDR encoding according to an embodiment. System 100 represents an embodiment of a layered encoder, wherein input signal V 105 is coded using two layers: a base layer 135 and an enhancement or residual layer 185. Residual encoder 185 may be a single-layer encoder or a multi-layer encoder.

In an embodiment, input signal V 105 may represent an input VDR signal represented by a high bit-depth resolution (e.g., 12 or more bits per color component in an 4:4:4 color format, such as RGB 4:4:4). This VDR signal may be processed by a dynamic range compression process (e.g., a tone mapping operator or a quantizer) 110 to generate signal S 112. In some embodiments, the dynamic range compression process may also comprise other non-linear or linear image transformation processes. Signal S may be in the same or lower spatial resolution than signal V. Signal S may be represented in a lower bit-depth resolution than V, e.g., 8 bits per color component. Signal S may be in the same color format as V, or in other embodiments, it may be in a different color format, e.g., YCbCr 4:2:0.

In an embodiment, base layer (BL) signal S 112 may be processed by BL Encoder 130 to derive compressed signal 135. In an embodiment, coding 130 may be implemented by any of the existing video encoders, such as an MPEG-2 or MPEG-4 video encoder, as specified by the motion pictures expert group (MPEG) specifications.

An enhancement (or residual) layer 175 may be generated by decoding signal 135 in BL decoder 140, generating a predicted value of the original VDR signal V (165), and subtracting the predicted value (165) from the original to generate a residual signal 175. In an embodiment, predictor 160 may be implemented using multivariate multiple-regression models as described in International Patent Application No. PCT/US2012/033605 filed 13 Apr. 2012. Residual signal 175 may be further compressed by residual encoder 180 to generate an encoded residual signal 185. In an embodiment, coding 180 may be implemented by any of the existing video encoders, such as an MPEG-2 or MPEG-4 video encoder, as specified by the motion pictures expert group (MPEG) specifications, or other image and video encoders, such as JPEG2000, VP8, Flash video, and the like. Encoding 180 may also be preceded by other image processing operations, such as color transformations and/or non-linear quantization.

Due to the quantization processes in either dynamic range compressor 110 or encoders 130 and 180, in a VDR decoder, the reconstructed VDR signal may exhibit quantization-related related artifacts, such as false contouring artifacts. One approach to reduce these artifacts may incorporate post-processing techniques, such as de-contouring; however, such techniques increase the computational complexity of the decoder, may not completely remove false contours, and may even introduce other undesired artifacts. A second approach to reduce false contouring may incorporate applying encoding pre-processing methods, such as dithering. However, pre-dithering increases the entropy of the input signal and thus degrades overall compression efficiency. An embodiment proposes a novel approach to prevent false contouring artifacts by adaptively adjusting the VDR to SDR dynamic range compression process 110 so that the number of potential false contours is prevented and minimized.

In an embodiment, encoding system 100 may also include a false contour detector (FCD) 120, which estimates the potential severity or visibility of false contouring artifacts in the decoded stream. As will be described later herein, given signals V and S, FCD 120 adjusts the parameters of dynamic range compressor 110 so that the number of potential false contouring artifacts is minimized Such parameters may be transmitted to a decoder, for example, as part of the coded bit stream using metadata 167, or they may be used by the encoder to derive the prediction parameters being used in predictor 160.

As defined herein, the term "metadata" may relate to any auxiliary information that is transmitted as part of the coded bitstream and assists a decoder to render a decoded image. Such metadata may include, but are not limited to, information related to: color space or gamut transformations, dynamic range, and/or quantization parameters, such as those described herein.

Example Dynamic Range Compression

Layered VDR coding system 100 includes the dynamic range compressor 110, which maps the original VDR signal 105 to a base layer (e.g., SDR) signal 112. In an embodiment, the input-output characteristics of the dynamic range compressor can be defined by a function Q( ) and a set of parameters P. Thus, given VDR input $v_i$, the SDR output $s_i$ can be expressed as $$s_i = Q(v_i, P). \quad (1)$$

Figure 2:
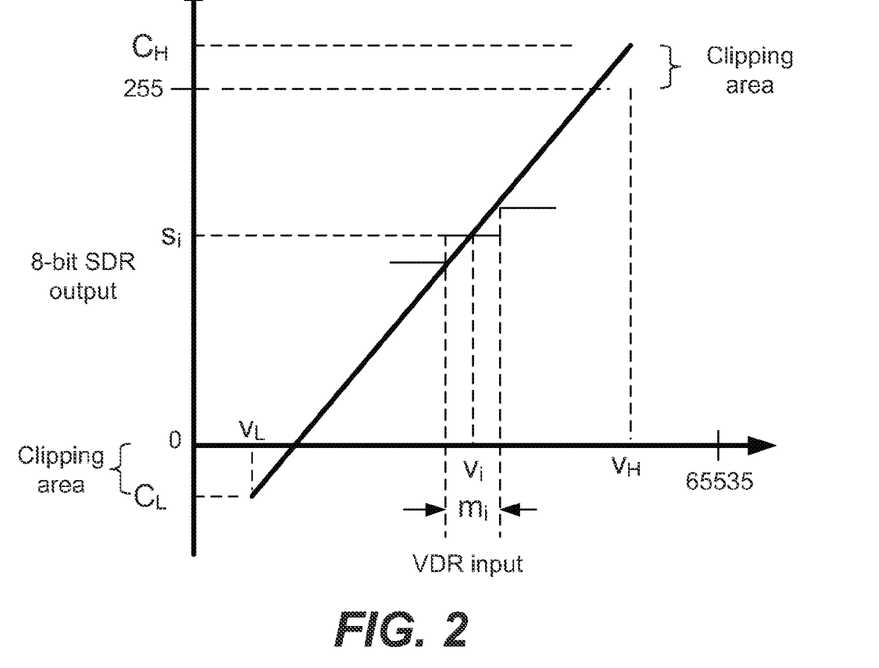
FIG. 2 depicts an example uniform dynamic range compression function according to an embodiment of the present invention.

FIG. 2 depicts an example embodiment of dynamic range compressor using a uniform quantizer, where $$s_i = Q(v_i, P) = \left\lfloor \frac{C_H - C_L}{v_H - v_L}(v_i - v_L) + C_L + O \right\rfloor, \quad (2)$$

where O is a rounding offset and $P = \{C_H, C_L\}$. In equation (2), the $v_L$ and $v_H$ values are typically defined based on the dynamic range characteristics of a group of frames in the input video sequence. Given $V_L$ and $V_H$, the $\{C_H, C_L\}$ parameters control the amount of dynamic range quantization and the number of potential perceptually visible false contours. In FIG. 2, the VDR input is expressed using 16 bits, while the SDR output is expressed using 8 bits. As depicted in FIG. 2, in certain embodiments, dynamic range compression may be followed by clipping. For example, SDR values higher than 255 may be clipped to the value 255 and SDR pixel values lower than 0 may be clipped to the value 0.

In one embodiment, the quantizer is uniform and is applied only to the gamma corrected luminance component of the VDR signal (e.g., the Y component in a YCbCr signal). In other embodiments, the quantizer may be non-uniform, may operate independently to more than one color component of the input signal, and may operate in a perceptual quantization domain.

Given equation (2), an embodiment of the de-quantization (or dynamic range expansion) process can be expressed as $$\bar{v}_i = Q^{-1}(s_i) = \frac{v_H - v_L}{C_H - C_L}(s_i - C_L) + v_L. \quad (3)$$

In one embodiment, the linear quantized data will be compressed via lossy compression 130 and the inverse quantization function may be obtained via linear regression, for example, by fitting a low order polynomial between the VDR and base layer data set. In an embodiment, given a parametric model of the dynamic range expansion function, such as:

$$Q^{-1}(s_i) = a_2 s_i^2 + a_1 s_i + a_0, \quad (4)$$

the parameters of such a model (e.g., $a_0$, $a_1$, and $a_2$,) can be solved by minimizing the mean square error (MSE) between the predicted VDR value and the input VDR values, as depicted in equation (5) below:

$$\min \sum_{i=0}^{M-1} \|Q^{-1}(s_i) - v_i\|^2. \quad (5)$$

When the dynamic range compression is followed by clipping, prediction of the VDR data may be improved by using the unclipped SDR data to compute equation (5).

Given the dynamic range compression function of equation (1), an embodiment selects a set of parameters P to minimize the number of potential false contours in the reconstructed VDR signal. For example, given the linear quantizer of equation (2), if the distribution of the pixel values in the VDR picture has a main peak closer to zero pixel values and a long trail towards the maximum pixel value, $C_L$ may be set to zero ($C_L = 0$), and then a value for $C_H$ which minimizes the false contouring artifact in the final reconstructed VDR may be derived. A higher $C_H$ value may reduce the false contouring artifacts; however, high $C_H$ values may increase the bit rate of the residual stream 185, and thus affect overall coding efficiency.

In an embodiment, a selection of dynamic range compression parameters (e.g., $[C_L \, C_H]$) may be kept constant over the frames of a video scene (e.g., a group of pictures), which may support maintaining constant luminance within the scene and facilitate the motion estimation processes within the base layer and enhancement layer codecs (e.g., 130 and 180).

False Contouring Detection and Prevention

Figure 3:
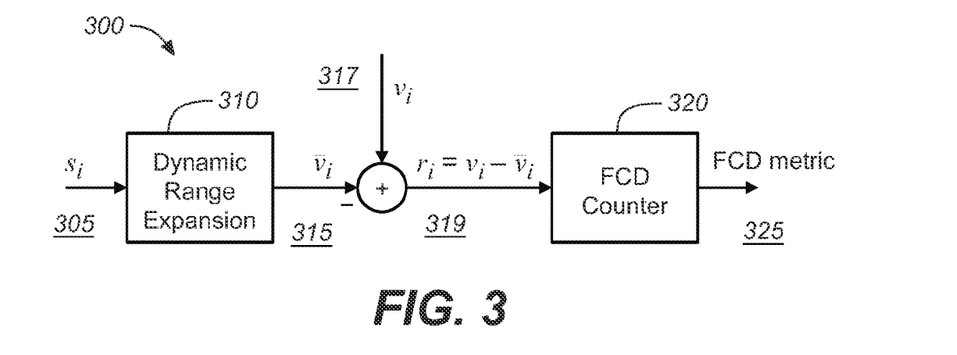
FIG. 3 depicts an example system for detecting false contours according to an embodiment of the present invention.

FIG. 3 depicts an example of a false contouring detector (FCD) 120 according to an embodiment of the present invention. FCD system 300 includes a dynamic range expansion processor 310 and an FCD counter 320. Dynamic range expansion processor 310 receives the SDR input $s_i$ 305 (or S 112) and using the inverse process used by dynamic range compression unit 110, it outputs an approximation (or predicted version) of the original VDR input, denoted herein as $\bar{v}_i$ 315. Signal $\bar{v}_i$ may also be referred to as the predicted $v_i$ or the de-quantized $v_i$. Given inputs $v_i$ and $\bar{v}_i$, FCD system 300 computes the prediction error or residual $$r_i = v_i - \bar{v}_i, \quad (6)$$

which is inputted for further processing to FCD Counter 320. Given a residual image $r_i$ 319, FCD Counter unit 320 outputs (according to a given criterion) the number of potential perceptually visible false contours in the reconstructed VDR signal due to the parameters chosen for dynamic range compression.

In an embodiment, in equation (6), the residual may be computed as $r_i = v_i - \hat{v}_i$, where $\hat{v}_i$ denotes the predicted VDR signal 165, derived directly from predictor 160.

In FCD Counter 320, detecting and counting false contours in the input residual comprises a pixel level detection component and a picture (or frame) level detection component.

Example Pixel-level Detection

Figure 4:
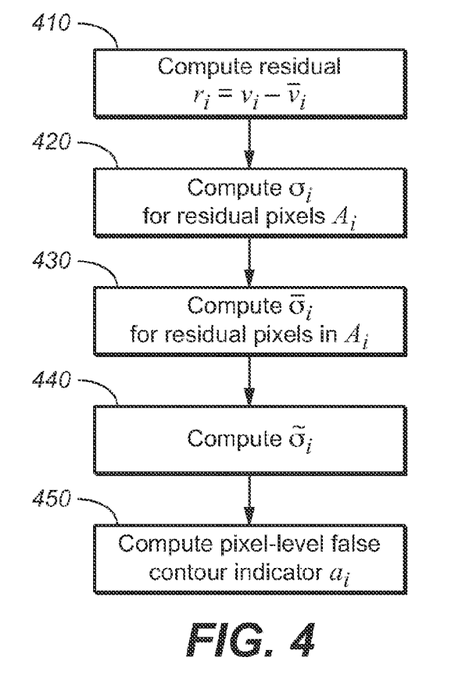
FIG. 4 depicts an example processing flow for detecting false contours at the pixel level according to an embodiment of the present invention.

FIG. 4 depicts an example process for detecting false contours at the pixel level according to an embodiment. Given a residual pixel $r_i$ (step 410), $A_i$ denotes an area of N pixels (e.g., 3×3 or 5×5) surrounding pixel $r_i$, with pixel $r_i$ at the center of that area. The mean $\mu_i$ and standard deviation $\sigma_i$ values (step 420) for residual pixels in $A_i$ are computed according to equations (7) and (8), below:

$$\mu_i = \frac{1}{N} \sum_{j \in A_i} r_j, \text{ and} \quad (7)$$

$$\sigma_i = \sqrt{\frac{1}{N} \sum_{j \in A_i} (r_j - \mu_i)^2}. \quad (8)$$

For a given dynamic range compressor 110, $m_i$ denotes the range of $v_i$ input values that correspond to the same $s_i$ output value. For example, for the uniform quantizer depicted in FIG. 2, all $m_i$ values are identical, and from equation (2), $$m_i = m = \frac{v_H - v_L}{C_H - C_L}. \quad (9)$$

In this embodiment, uniform quantization results in, $$r_i \in \left[-\frac{m}{2}, \frac{m}{2}\right]. \quad (10)$$

From equations (8), (9), and (10), the standard deviation of the residual pixels in the area of interest is strongly correlated with the parameters $[C_L \, C_H]$ that define the slope of the uniform quantizer.

Let $$\bar{\sigma}_i = \frac{\sigma_i}{m}, \quad (11)$$

denote the normalized standard deviation (step 430) of all the residual pixels in $A_i$, and let $$\tilde{\sigma}_i = \text{median\_filter}(\bar{\sigma}_k), \text{ for all } k \in \tilde{A}_i, \quad (12)$$

denote the median (step 440) of all normalized standard deviations in a pixel area $\tilde{A}_i$ surrounding pixel $r_i$. Denote as $\alpha_i$ a pixel-level false contour indicator, then, given thresholds $T_H$, $T_L$, $L_L$, and $L_H$, residual $r_i$ 319 is associated with a potential false contour if $\alpha_i=1$, where (step 450)

$$\alpha_i = (\tilde{\sigma}_i < T_H) \cdot (\tilde{\sigma}_i > T_L) \cdot (v_i > L_L) \cdot (v_i < L_H). \quad (13)$$

In one embodiment, in equation (12), area $\tilde{A}_i = A_i$. In other embodiments, area $\tilde{A}_i$ may be larger than $A_i$. In an example embodiment, $T_H = \frac{1}{5}$, and $T_L = \frac{1}{16}$, and for 16-bit VDR inputs, $L_L = 10,000$ and $L_H = 60,000$. The false contouring artifact exists in the areas where $\tilde{\sigma}_i$ is smaller than a threshold $T_H$. However, very small values of $\tilde{\sigma}_i$ may indicate areas that were already very smooth; hence, to avoid false positives, $\tilde{\sigma}_i$ is set higher than a threshold $T_L$. From a perceptual point of view, false contouring artifacts are difficult to observe in the very dark and very bright areas; hence thresholds $L_L$ and $L_H$ may be used to define very dark and very bright areas, respectively, where detecting false contours may be less significant.

Example Picture-level Detection

Figure 5:
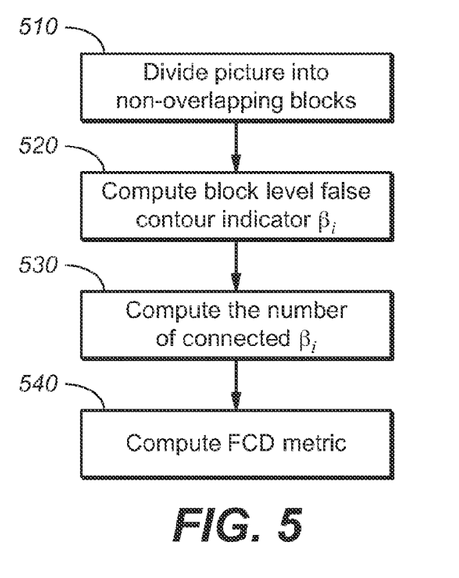
FIG. 5 depicts an example processing flow for detecting false contours at the picture level according to an embodiment of the present invention.

While $\alpha_i$ of equation (13) provides an indication of false contours at the pixel level, from a perceptual point of view, detecting false contours at the picture level may be more significant. For example, a false contouring artifact will be perceptually visible only if a large picture area has multiple pixels with $\alpha_i=1$ and these pixels are connected. FIG. 5 depicts an example process for detecting false contours at the picture level according to an embodiment of the present invention.

In an embodiment, a picture or video frame is divided into non-overlapping blocks $B_j$ (e.g., 16×16 or 32×32 pixel blocks) (step 510). Let $\beta_j$ denote a binary, block level, false contour indicator that represents how noticeable are false contouring artifacts in that block. In an embodiment, given $$b_j = \frac{1}{|B_j|} \sum_{i \in B_j} \alpha_i, \text{ and} \quad (14)$$

$$c_j = \frac{1}{|B_j|} \sum_{i \in B_j} (\tilde{\sigma}_i < T_L), \quad (15)$$

where $|B_j|$ denotes the number of pixels in area $B_j$, then $$\beta_j = (b_j > T_B) \cdot (c_j < T_B). \quad (16)$$

The variable $c_j$ and the threshold $T_B$ of equations (15) and (16) are introduced to compensate for the false contour detection across two blocks. In an embodiment, $T_B=0.1$.

After computing $\beta_j$ for each block (step 520), a potential false contour is counted if a number of blocks for which $\beta_j=1$ are considered connected (step 530). In an embodiment, given a threshold $T_c$ (e.g., $T_c=0$), let $$\{\theta_k\} = \text{connected\_component} \{B_j\}, \quad (17)$$

denote the number of 4-connected components among the set of $\beta_j$. For example, using the MATLAB programming language, $\{\theta_k\}$ can be computed using the function bwconncomp($\beta_j$, 4). Then, in step 540, the value of FCD metric $$FCD = |\{|\theta_k| > T_c\}|, \quad (18)$$

denotes the number of potential perceptually visible false contouring artifacts in the picture area of interest.

In general, thresholds $L_L$, $L_H$, and $T_C$ depend on both the display characteristics of the target VDR display system and the characteristics of the human visual system.

Scene-Based False Contour Prevention

Figure 6A:
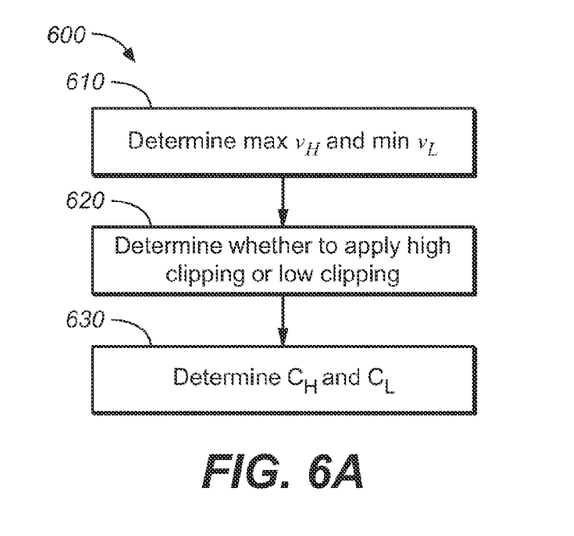
FIG. 6A and FIG. 6B depict example processing flows for preventing false contours at the scene level in video coding according to an embodiment of the present invention.
Figure 6B:
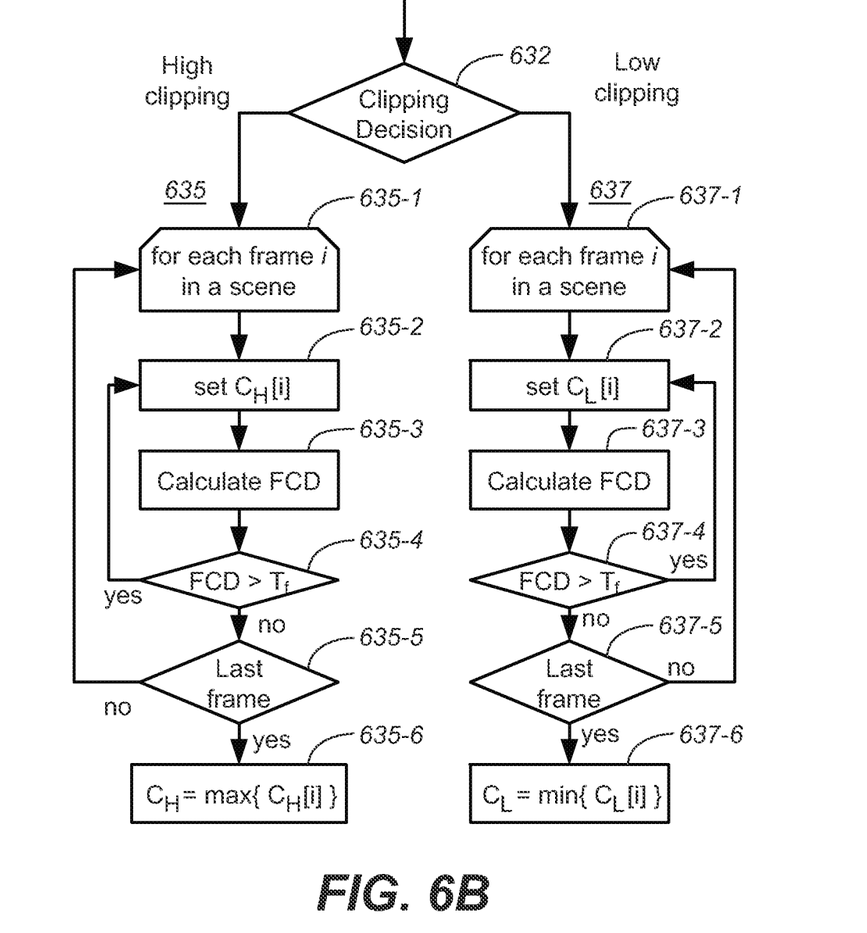

FIG. 6A and FIG. 6B depict example processing flows for detecting and preventing perceptually visible false contouring artifacts at the scene level when coding a video sequence according to an embodiment of the present invention. As explained earlier, the number of false contouring artifacts is in general correlated with the amount of quantization during the compression of the dynamic range of the input VDR signal. Given a dynamic range compression function $Q(v_i, P)$, for a given set of parameters P, an embodiment measures the number of potential false contours. Then, iteratively, adjusts P so that the number of potential perceptually visible false contours is minimized. For example, given the uniform quantizer of equation (2) (also depicted in FIG. 2), within a scene of a video, an embodiment first determines the max $V_H$ and min $V_L$ values within the scene (step 610) and then iteratively determines the $C_H$ and $C_L$ values that minimize the number of potential false contours (steps 620 and 630).

As used herein, the term 'scene' relates to a group of consecutive frames or pictures, or to a collection of consecutive video frames or pictures that in general have similar dynamic range and color characteristics.

As used herein, the term 'high clipping' relates to a preference during dynamic range compression to clip mostly towards the high pixel values (e.g., highlights). Such clipping is preferable when a histogram of the pixel values in a scene indicate that the majority of pixel values tend to be closer to the dark area and the histogram shows a long tail in the highlights (bright) area.

As used herein, the term 'low clipping' relates to a preference during dynamic range compression to clip mostly towards the low pixel values (e.g., dark shadows). Such clipping is preferable when a histogram of the pixel values in a scene indicates that the majority of pixel values tend to be closer to the bright area and the histogram shows a long tail in the dark area.

In an embodiment, the decision whether to perform low clipping or high clipping (620) may be determined by computing the skewedness of the histogram of pixel values in a scene. Given $\mu$ and $\sigma$, the estimated mean and standard deviation values of the luminance values of all N input $v_i$ pixels in a scene, skewedness may be defined as $$\text{skewness} = \frac{1}{N\sigma^3} \sum_i (v_i - \mu)^3. \qquad (19)$$

If skewedness is negative, the data is spread out more towards the left of the mean. If skewedness is positive, the data is spread out more to the right of the mean.

FIG. 6B depicts in more details an embodiment of the iterative process 630 to determine the $C_H$ and $C_L$ values that will minimize false contouring artifacts in the output of a VDR decoder. Depending on the clipping decision 632 (which can be made using the skewedness estimate of equation (19)), process 600 may follow either the 635 or the 637 path. The chosen path is computed for each frame and all frames in the scene.

Under low clipping (637), for each frame i, the iterative process starts (step 637-2) with an initial $C_L[i]$ value (e.g., $C_L[i]=0$) and computes the FCD metric using equation (18) (step 637-3). If the number of detected perceptually visible false contours is equal or lower than a given threshold $T_f$ (e.g. $T_f=0$), then the process continues to the next frame (step 637-1), until all frames have been processed. Otherwise, if the number of detected perceptually visible contours is higher than the given threshold, then in step 637-2 the $C_L[i]$ value is decreased by a specified step (e.g., by 5 or by 10) and the process repeats. When all the frames in a scene have been processed, then the $C_L$ value for the dynamic compression of the scene is selected as the minimum value among all computed $C_L[i]$ values.

Under high clipping (635), for each frame i, the iterative process starts (step 635-2) with an initial $C_H[i]$ value (e.g., $C_H[i]=235$) and computes the FCD metric using equation (18) (635-3). If the number of detected perceptually visible false contours is equal or lower than a given threshold $T_f$ (e.g. $T_f=0$), then the process continues to the next frame (635-1), until all frames have been processed. Otherwise, if the number of detected perceptually visible contours is higher than the given threshold, then in step 635-2 the $C_H[i]$ value is increased by a specified step (e.g., by 5 or by 10) and the process repeats. When all the frames in a scene have been processed, then the $C_H$ value for the dynamic compression for the scene is selected as the maximum value among all computed $C_H[i]$ values.

FCD Metric Based on Visibility Threshold

Figure 7A:
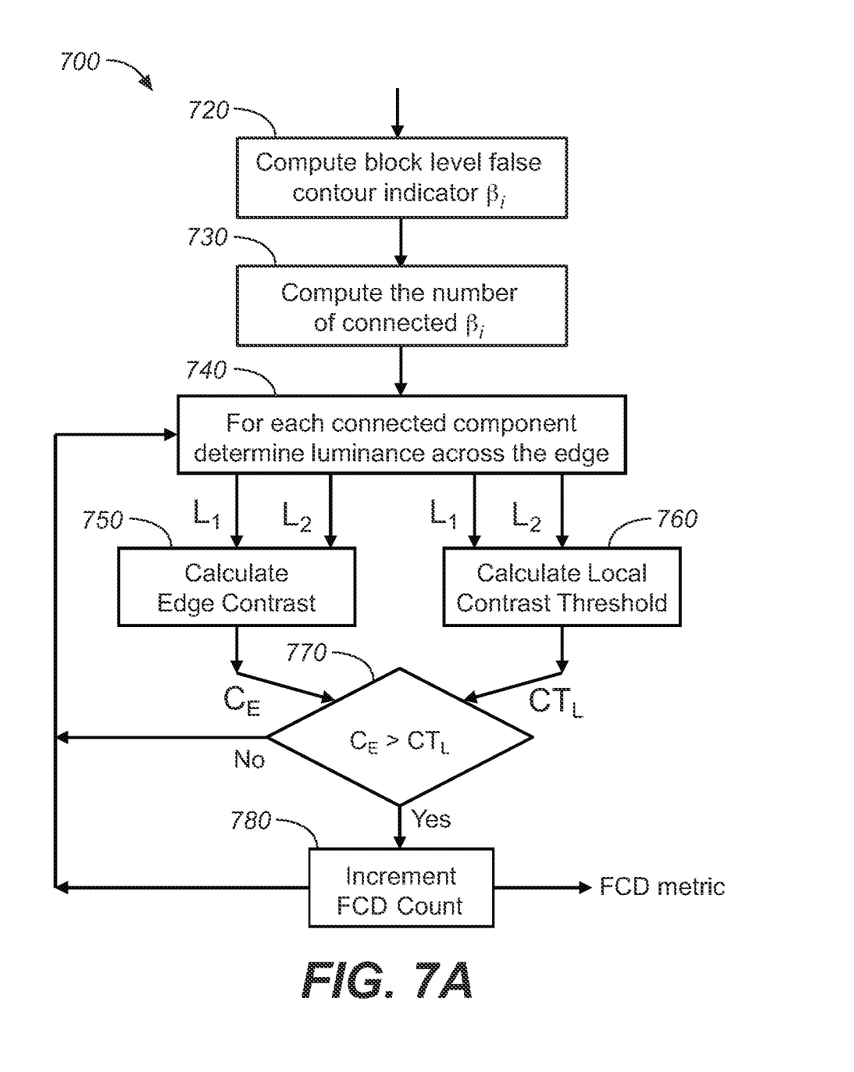
FIGS. 7A, 7B, and 7C depict example processing flows for computing a false contour detection metric according to an embodiment of the present invention.
Figure 7B:
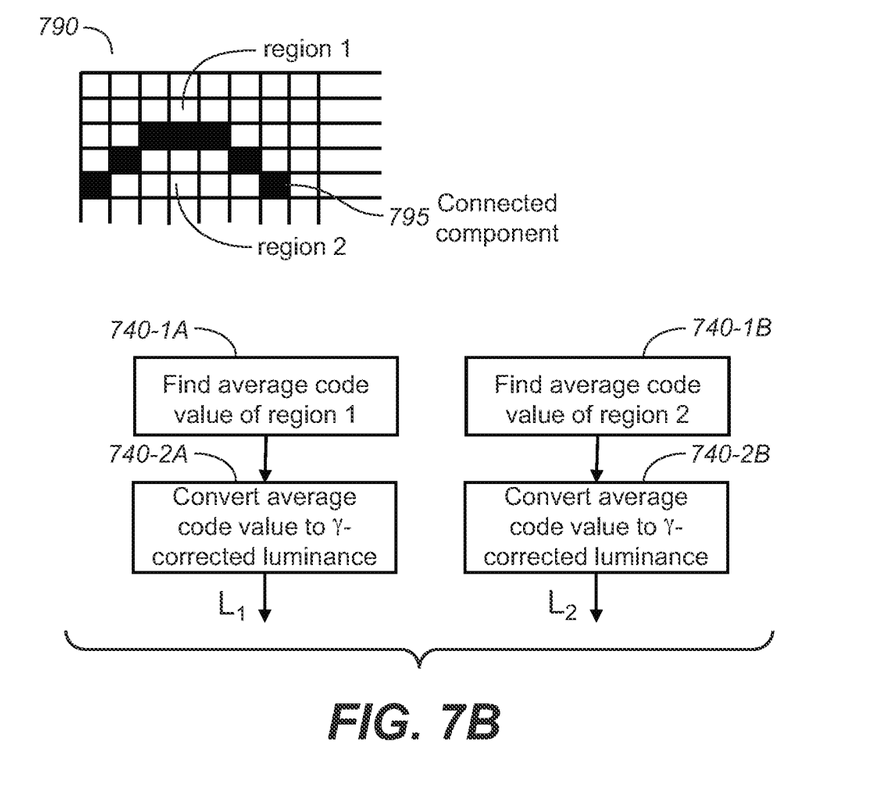
Figure 7C:
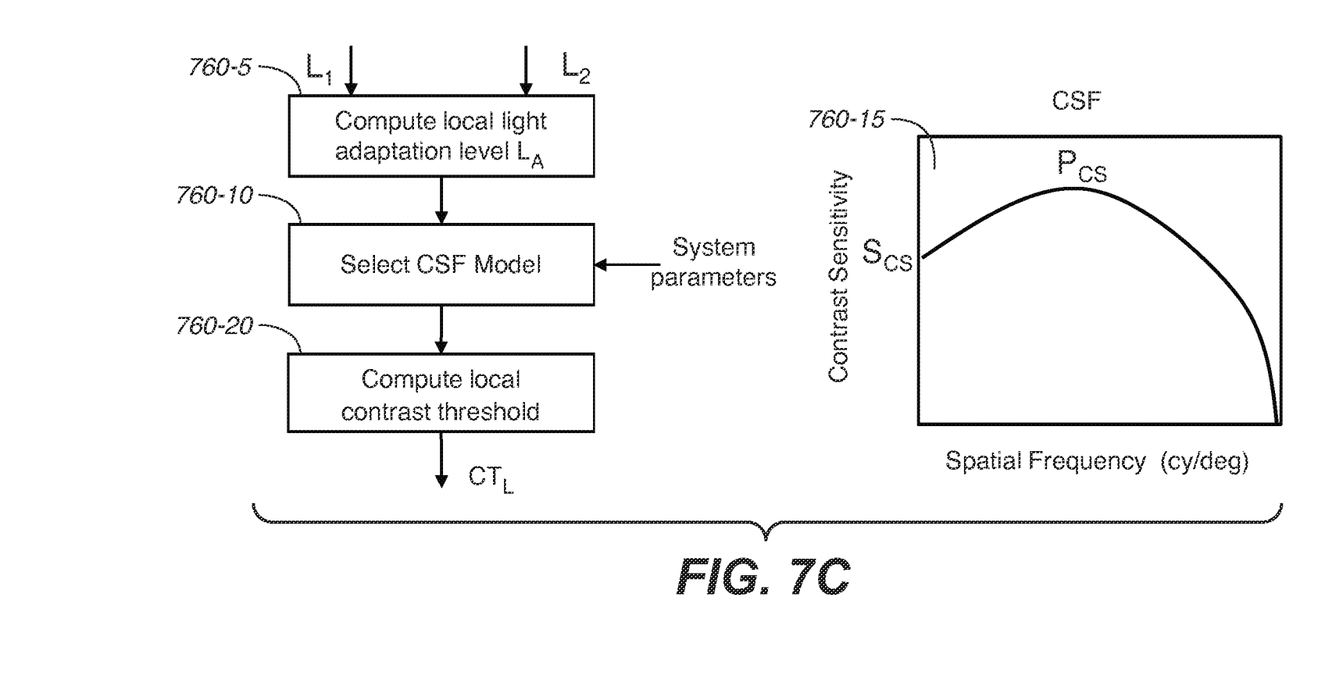

FIGS. 7A, 7B, and 7C depict another example process to compute an FCD metric in steps 540, 635-3, or 637-3 according to an embodiment based on a visibility threshold. Similarly to the earlier discussion, this metric is also based on the connected $\beta_i=1$ components (e.g., $\theta_k$), as computed by equation (17); however, instead of counting all connected components, it only counts connected components which have an edge contrast higher than a local visibility contrast threshold.

As depicted in FIG. 7A, steps 720 and 730, similarly to steps 520 and 530, are used to compute the number of connected $\beta_i=1$ components, for example, using equations (14-17). An example of such a connected component (795) is depicted in FIG. 7B (790).

For each connected component (e.g., 795), FIG. 7B depicts an example process to compute the gamma-corrected luminance values across its edges (step 740). Using a pixel window (e.g., 3×3 or 5×5) around each edge of a connected component, steps 740-1A and 740-1B compute first the average code (pixel) values in regions 1 and 2 around the edge. In an example embodiment, the average code values may be computed only for the luminance component of the relevant pixel values (e.g., Y, in YCbCr).

Next, in steps 740-2A and 740-2B, the average code values are converted to gamma-corrected luminance values $L_1$ and $L_2$. There are many alternatives to compute gamma-corrected luminance values based on a variety of standard display calibration models. In one embodiment $$L = V_{avg}^\gamma, \qquad (20)$$

where $V_{avg}$ is the average code value and $\gamma$ is the gamma

Given the luminance values $L_1$ and $L_2$, step 750 may compute the edge contrast $C_E$ as $$C_E = \frac{|L_1 - L_2|}{L_1 + L_2}. \qquad (21)$$

FIG. 7C depicts an example process to compute the local contrast threshold in step 760. In step 760-5, the local light adaptation level $L_A$ may be computed as $$L_A = \frac{L_1 + L_2}{2}. \qquad (22)$$

Based on the local light adaptation level and other system parameters, in step 760-10, a contrast sensitivity function (CSF) model (e.g., CSF 760-15) is either computed or selected from a family of suitable pre-computed models. Given the CSF model (e.g., 760-15), a contrast sensitivity value $S_C$ is derived. In some embodiments, $S_C$ may be defined as the peak contrast sensitivity (e.g., $P_{CS}$ in 760-15). In other embodiments, $S_C$ may be defined as the intersection of the contrast sensitivity function with the Y-axis (e.g., $S_{CS}$ in 760-15). In step 760-20, given the computed local contrast sensitivity value $S_C$, the local contrast threshold may be computed in as $$CT_L = \frac{1}{S_c}. \qquad (23)$$

Returning back to FIG. 7A, after steps 750 and 760, where the $C_E$ and $CT_L$ values are computed for one of the connected components, in step 770, these two values are compared. If $C_E$ is larger than the local contrast threshold, then the connected component under consideration is considered perceptually visible and the FCD count for the whole picture or frame is incremented by one, otherwise, the connected component is not considered perceptually visible and is not counted, and the process continues back to step 740. At the end, the final FCD metric represents the total number of potential perceptually visible false contours in a picture.

The methods described herein for a uniform quantizer can easily be extended to other types of quantizers, such as non-uniform equalizers. By dividing the original input range $[v_L, v_H]$ into p non-overlapping input ranges $[v_{Li}, v_{Hi}]$ for $i=1, 2, \ldots, p$, then the problem of preventing false contour artifacts can be expressed as the problem of identifying a set of parameters $P_i$, e.g., $P_i = \{C_{Hi}, C_{Li}\}$, for $i=1, 2, \ldots, p$, so that the FCD metric within each input segment (e.g., $FCD_i$) is equal or below a given threshold.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to detecting and preventing false contours, such as those described herein. The computer and/or IC may compute any of a variety of parameters or values that relate to detecting and preventing false contours as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods to detect and prevent false contouring artifacts as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to detecting and preventing false contours in coding VDR sequences are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for converting input images, comprising:
   a) receiving an input image in a sequence of images, wherein the input image has a first dynamic range;
   b) converting the input image into a second image, wherein the second image has a second dynamic range, which is lower than the first dynamic range, and wherein the conversion is based on a dynamic range compression function that comprises one or more parameters;
   c) computing a residual image using the input image and the second image;
   d) determining whether the residual image has at least one false contour; and
   e) upon determining that the residual image has at least one false contour, adjusting at least one of the parameters,
   wherein the determining step d) comprises a pixel-level detection method and a picture-level detection method,
   wherein the pixel-level detection method comprises computing pixel-level false contour indicators based on a respective median of a normalized standard deviation of all pixels in a surrounding area of a respective pixel in the residual image,
   wherein the picture-level detection method comprises computing a false contours detection (FCD) metric as a function of a number of connected block level false contour indicators that are computed for blocks of the residual image based on one or more pixel-level false contour indicators.

2. The method as recited in claim 1 further comprising:
   repeating the steps b) through the step e), inclusive, until a count of the at least one false contour is minimized.

3. The method as recited in claim 2 wherein the count of the at least one false contour is reduced below a threshold value.

4. The method of claim 1, wherein the input image comprises a visual dynamic range (VDR) image.

5. The method of claim 1, further comprising:
   compressing the second image into a base layer signal;
   compressing an image derived from the input image and the second image into one or more enhancement layer signals.

6. The method of claim 1, wherein the dynamic range compression function comprises a uniform quantizer and the parameters comprise a low quantized value ($C_L$) and a high quantized value ($C_H$).

7. The method of claim 1, wherein computing the residual image comprises:

applying a dynamic range expansion function to the second image to generate a predicted input image; and computing the residual image as a difference image between the input image and the predicted input image.

8. The method of claim 1, wherein the pixel-level detection method comprises:

for each pixel in the residual image:
defining a surrounding area of pixels surrounding the pixel;
computing a standard deviation of all pixels in the surrounding area;
computing a normalized standard deviation of all pixels in the surrounding area based on the standard deviation;
computing a median standard deviation based on the normalized standard deviations in the surrounding area; and
computing a pixel-level false contour indicator based on the median standard deviation and one or more thresholds.

9. The method of claim 1, wherein the picture-level detection method comprises:

dividing the residual image into non-overlapping blocks;
for each block, computing a block level false contour indicator based on one or more pixel-level false contour indicators;
deriving a number of connected block level false contour indicators based on the block level false contour indicators; and
deriving a false contours detection (FCD) metric as a function of the number of connected block level false contour indicators and at least one threshold value.

10. The method of claim 9, wherein at least one pixel level false contour indicator is computed according to the method of claim 8.

11. A method for converting input images, comprising:

receiving a sequence of visual dynamic range (VDR) images in a scene;
for each VDR image i in the scene;
converting the i-th VDR image into an i-th standard dynamic range (SDR) image, wherein the i-th SDR image has a lower dynamic range than the i-th VDR image, and wherein the conversion is based on a uniform dynamic range compression function that comprises image-dependent parameters $C_L[i]$ and $C_H[i]$;
step a) setting the $C_L[i]$ and $C_H[i]$ to initial values;
step b) computing an i-th residual image using the i-th VDR image and the i-th SDR image;
step c) determining whether the i-th residual image has at least one false contour;
step d) upon determining that the i-th residual image has at least one false contour, adjusting at least one of the image-dependent parameters $C_L[i]$ and $C_H[i]$;
repeating steps b) to d), inclusive, until a count of the at least one false contour is minimized;
computing a scene-dependent $C_H$ value for the whole scene based on a maximum of all the computed image-dependent $C_H[i]$ parameters;
computing a scene-dependent $C_L$ value for the whole scene based on a minimum of all the computed image-dependent $C_L[i]$ parameters; and
converting all the VDR images in the scene into SDR images using the uniform dynamic range compression function and the scene-dependent $C_H$ and the $C_L$ parameters, wherein the determining step c) comprises computing a pixel-level false contour indicator based on a median of a normalized standard deviation of all pixels in a surrounding area of a pixel in the i-th residual image.

12. The method of claim 11, further comprising:
before step a), determining whether to apply a high clipping mode or a low clipping mode to all the VDR images in the scene.

13. The method of claim 12, wherein in high clipping mode, in step d), only the $C_H[i]$ parameter is increased; and in low clipping mode, in step d), only the $C_L[i]$ parameter is decreased.

14. The method of claim 12, wherein the determining whether to apply a high clipping mode is based on computing a skewness value for the scene and the skewness value is positive.

15. The method of claim 12, wherein the determining whether to apply a low clipping mode is based on computing a skewness value for the scene and the skewness value is negative.

16. The method of claim 11, further comprising:
compressing the i-th VDR image in the scene using a base layer based on the i-th SDR image and one or more enhancement layers.

17. The method of claim 1, wherein in step d) and e) the at least one false contour is perceptually visible.

18. The method of claim 11, wherein in step c) the at least one false contour is perceptually visible.

19. The method of claim 1, wherein the picture-level detection method comprises:

dividing the residual image into non-overlapping blocks;
for each block, computing a block level false contour indicator based on one or more pixel-level false contour indicators;
deriving a number of connected block level false contour indicators based on the block level false contour indicators;
for each one of the number of connected block level false contour indicators,
computing an edge contrast and a local contrast threshold; and
determining the one of the number of connected block level false contour indicators is perceptually visible if the edge contrast is higher than the local contrast threshold.

20. The method of claim 19, further comprising deriving the false contours detection (FCD) metric as a function of the number of connected block level false contour indicators that are perceptually visible and at least one threshold value.

21. The method of claim 19, wherein computing the edge contrast is based on computing luminances across edges of the one of the number of connected block level false contour indicators.

22. The method of claim 19, wherein computing the local contrast threshold is based on one or more system parameters and a contrast sensitivity function.

23. An apparatus comprising a processor and configured to perform the method recited in claim 1.

24. A non-transitory computer-readable storage medium having stored thereon computer-executable instruction for executing using one or more processors a method in accordance with claim 1.

* * * * *